(12) United States Patent
Zhang

(10) Patent No.: US 7,936,788 B2
(45) Date of Patent: May 3, 2011

(54) METHOD AND DEVICE FOR SIGNAL TRANSPORTING

(75) Inventor: Hongtao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 943 days.

(21) Appl. No.: 11/660,016

(22) PCT Filed: Jul. 13, 2005

(86) PCT No.: PCT/CN2005/001032
§ 371 (c)(1),
(2), (4) Date: Aug. 2, 2007

(87) PCT Pub. No.: WO2006/015533
PCT Pub. Date: Feb. 16, 2006

(65) Prior Publication Data
US 2008/0107418 A1    May 8, 2008

(30) Foreign Application Priority Data

Aug. 10, 2004    (CN) .......................... 2004 1 0058316

(51) Int. Cl.
*H04J 1/00* (2006.01)
(52) U.S. Cl. ......... 370/481; 370/471; 370/503; 370/907
(58) Field of Classification Search .................. 370/468, 370/535, 536, 252, 232, 538, 254, 464, 389, 370/516, 517, 465, 466, 537, 907, 481, 471, 370/503
See application file for complete search history.

(56) References Cited

U.S. PATENT DOCUMENTS

| 6,724,996 | B1 * | 4/2004 | Ballintine et al. .............. 398/98 |
| 2003/0048813 | A1 | 3/2003 | Lahav et al. | |
| 2008/0044183 | A1 * | 2/2008 | Perkins et al. .................. 398/58 |

FOREIGN PATENT DOCUMENTS

JP    2000-272249 A    10/2000

OTHER PUBLICATIONS

Supplementary European Search Report from European Patent Application EP 05763202.

* cited by examiner

*Primary Examiner* — Huy D Vu
*Assistant Examiner* — Dady Chery
(74) *Attorney, Agent, or Firm* — Conley Rose, P.C.; Grant Rodolph

(57) ABSTRACT

A method for signal transporting in an optical transport network comprises: presetting frame structures for an optical channel payload unit OPUx and an optical channel data unit ODUx of a 5G-path transporting constant-bit-rate CBR5G rate-level signals in an optical channel layer; and according to the frame structures of the optical channel payload unit OPUx and the optical channel data unit ODUx, mapping and multiplexing the constant-bit-rate CBR5G rate-level signals to the optical channel layer of the optical transport network for transport through the optical transport network. The present invention also discloses a corresponding device for signal transporting. Since there are provided OPUx/ODUx/OTUx for transporting CBR5G rate-level signals in the OTN, thus enabling transparent transport of the CBRG5 signals in the OTN as well as direct scheduling, supervision and management on the CBR5G signals in the OTN.

20 Claims, 13 Drawing Sheets

|   | 29 | 30 | 31 | 32 | |
|---|----|----|----|----|---|
| 1 | RES | RES | JC | JC | 3808D |
| 2 | RES | RES | JC | NJO | PJO | 3808D |
| 3 | RES | RES | JC | JC | 3808D |
| 4 | PSI | PSI | JC | NJO | PJO | 3807D |

|   | 15 | 16 | | 3824 |
|---|----|----|---|------|
| 1 | RES | JC | 3808D | |
| 2 | RES | JC | 3808D | |
| 3 | RES | JC | 3808D | |
| 4 | PSI | NJO | PJO | 3807D |

METHOD AND DEVICE FOR SIGNAL TRANSPORTING

FIELD OF THE INVENTION

The present invention relates to the field of optical communication technologies, and more particularly to a signal transport method and device applied on an OTN (Optical Transport Network).

BACKGROUND OF THE INVENTION

The rapid development of data communication brings information explosion, and results in tremendous growth in demand for transport network bandwidth. The optical fiber communication has characteristics of large capacity and high bandwidth, and thus becomes a relatively good solution to provide the transport network bandwidth. SONET/SDH technologies have been already accepted as a mature standard of transport networks. Conventionally, backbone networks used for high-speed transport are all based on the SONET/SDH technologies.

However, the primary disadvantage of the SONET/SDH network is that it has been optimized for TDM (Time Division Multiplexing) services. Its protocols lack the function of effective management of services other than conventional voice services that are based on the TDM technologies. On the other hand, the viability of the SONET/SDH network has to be guaranteed by a protection circuit. Although the protection circuit provides an excellent ability of fault correction in a very short time, it consumes considerable bandwidth. The bandwidth trunk line is not flexible, and the entire loop has to run at the same rate. More importantly, an optical-electrical-optical conversion is required at each SONET/SDH node, which further increases the complexity of devices. Therefore, the SONET/SDH network has an inherent limitation in terms of management and support for an optical network with large bandwidth.

In order to support a larger transport network bandwidth, the further development of optimal fiber communication has adopted the technology of Wavelength Division Multiplexing to compose a DWDM (Dense Wavelength Derision Multiplexing) optical transport network. This DWDM optical transport network not only increases transport capacity, but also has the potential and practical value of networking. However, the DWDM optical transport network can not serve as the next generation transport network due to its own disadvantages, such as a weak supervision capability, poor scheduling and networking capabilities. Consequently, the OTN (Optical Transport Network) came into being as the architecture of next generation transport network.

Generally, the OTN is defined as an optical network with advanced features, such as optical channel routing, switching, supervising and viability, and is capable of transmitting various client signals in a flexible, extendible and reliable way with a larger bandwidth granularity (up to a maximum of tens of Gbps per optical channel). In the OTN with full functions, the transport network functions will transits from the SONET/SDH network to the OTN, and supply features of the service layer to satisfy demands of various fundamental devices and special services.

At present, one hot issue concerning the OTN is the building of Metropolitan Area Network. For building the metropolitan area network with the use of the OTN, it may be relatively ideal to network at a 10G rate level taking the network bandwidth into consideration. However, taking the optical performance into consideration, the networking at the 10G rate level has more problems than at a 2.5G rate level, e.g, significant optical attenuation, dispersion, etc., which would greatly decrease the distance between sites and accordingly increase the network investment cost. Consequently, the networking at a 5G rate level can get a compromise between the bandwidth and the investment cost to some extent.

Currently, only transport modes for client signals at three constant-bit-rate rate levels of CBR2G5, CBR10G, CBR40G have been defined in G.709 Protocol of the OTN standard established by the ITU-T (International Telecommunication Union Telecommunication) Standardization Sector, but no relevant definition has been provided for direct transport of CBR5G granular signals in the OTN.

For transporting the CBR5G signals through the OTN, the following two main solutions are conventionally adopted in the prior art.

The first solution utilizes the virtual cascade technology, and adopts the OPU1-2V to transport CBR5G signals though the virtual cascade of the OPU1's. Referring to FIG. 1, the method mainly includes the following steps:

First, with the use of the virtual cascading link technology, the CBR5G is mapped to a OPU1-2V frame to which OPU1-2VOH is added to form a frame in 2×3810×4 format.

Then, the frame is divided into an odd timeslot and an even timeslot, each composing an integrated OPU1.

Finally, the two OPU1s loaded with the CBR5G signals are mapped to two tributaries of ODU1/OTU1 which are transported through the OTN respectively through different routes.

The above solution in the prior art utilizes the virtual cascade technology to transport the CBR5G signals with the use of a 2×2.5G channel in the OTN, and hence can not implement directly the scheduling, supervision and management for the CBR5G granularity. In addition, it may cause different delays because the two 2.5G transport channels may run along different routes. Furthermore, in order to ensure that a sender and a receiver can both transmit and receive signals effectively, the sender and the receiver have to perform relatively complex processing on the virtual cascade protocol, and thus this solution is disadvantageous due to its high implementation cost.

The other solution in the prior art utilizes the OPU2 to transport the CBR5G signals, that is, loads the CBR5G signals to an OPU2 container for transport. Because the OPU2 is a 10G container, it can accommodate the CBR5G service. In a particular implementation, if the OPU2 container accommodates two CBR5G signals, these two CBR5G signals can be scheduled on the transport network as one granularity. Since the transport network merely can provide management and supervision for this one granularity, the two CBR5G signals being as two independent access sub-rates can't be scheduled, monitored or managed directly through the transport network overhead.

If the OPU2 container accommodates only one CBR5G signal, then the CBR5G signal has to be adapted to the OPU2, that is, data encapsulation and rate adaptation have to be performed on the CBR5G signal. Moreover, the 10G bearing capacity of the OPU2 only bears 5G services effectively, so the utilization of the container for an access node would be decreased greatly. Since there is no convergence mechanism, the utilization of bandwidth over the entire transport network may only be 50%, and thus the utilization of network bandwidth effectiveness may also be low.

SUMMARY OF THE INVENTION

Embodiments of the present invention provide a signal transport method and a device for transporting CBR5G signals transparently, which may achieve direct scheduling, supervision and management on the CBR5G signals in the OTN, and realize effective utilization of the OTN bandwidth.

An embodiment of the present invention provides a signal transport method applied in an optical transport network, which may include:

presetting frame structures for an optical channel payload unit OPUx and an optical channel data unit ODUx of a 5G-path transporting constant-bit-rate CBR5G rate-level signals in an optical channel layer;

according to the frame structures of the optical channel payload unit OPUx and the optical channel data unit ODUx, mapping and multiplexing the constant-bit-rate CBR5G rate-level signals to the optical channel layer of the optical transport network for transport through the optical transport network.

Optionally, the step of presetting may further include:

presetting an optical channel transport unit OTUx of the 5G-path transporting the constant-bit-rate CBR5G rate-level signals in the optical channel layer;

the step of mapping and multiplexing may include:

mapping the constant-bit-rate CBR5G rate-level signals to the optical channel payload unit OPUx;

mapping the optical channel payload unit OPUx to the optical channel data unit ODUx;

mapping the optical channel data unit ODUx to the optical channel transport unit OTUx for transport through the optical transport network.

Optionally, the step of presetting may further include:

presetting an optical data tributary unit ODTUx2 to map and multiplex the constant-bit-rate CBR5G rate-level signals transported through the 5G path in the optical channel layer to a 10G path;

the step of mapping and multiplexing may include:

mapping the constant-bit-rate CBR5G rate-level signals to the optical channel payload unit OPUx;

mapping the optical channel payload unit OPUx to the optical channel data unit ODUx;

mapping the optical channel data unit ODUx to the optical data tributary unit ODTUx2;

mapping and multiplexing the optical data tributary unit ODTUx2 to a corresponding timeslot of an optical channel data tributary unit group ODTUG2 for transport through the optical transport network.

Optionally, the step of mapping and multiplexing the optical data tributary unit ODTUx2 to a corresponding timeslot of an optical channel data tributary unit group ODTUG2 may include:

mapping the optical channel data tributary unit group ODTUG2 to an optical channel payload unit OPU2;

mapping the optical channel payload unit OPU2 to an optical channel data unit ODU2;

mapping the optical channel data unit ODU2 to an optical channel transport unit OTU2 for transport through the optical transport network.

Optionally, the step of mapping and multiplexing the optical data tributary unit ODTUx2 to a corresponding timeslot of an optical channel data tributary unit group ODTUG2 may include:

mapping the optical channel data tributary unit group ODTUG2 to an optical channel payload unit OPU2;

mapping the optical channel payload unit OPU2 to an optical channel data unit ODU2;

mapping the optical channel data unit ODU2 to an optical channel data tributary unit group ODTUG3;

mapping and multiplexing the optical channel data tributary unit group ODTUG3 to an optical channel payload unit OPU3;

mapping the optical channel payload unit OPU3 to an optical channel data unit ODU3;

mapping the optical channel data unit ODU3 to an optical channel transport unit OTU3 for transport through the optical transport network.

Optionally, the step of presetting may further include:

presetting an optical data tributary unit ODTUx3 to map and multiplex the constant-bit-rate CBR5G rate-level signals transported through the 5G path in the optical channel layer to a 40G path;

Optionally, the step of mapping and multiplexing may include:

mapping the constant-bit-rate CBR5G rate-level signals to the optical channel payload unit OPUx;

mapping the optical channel payload unit OPUx to the optical channel data unit ODUx;

mapping the optical channel data unit ODUx to the optical data tributary unit ODTUx3;

mapping and multiplexing the optical data tributary unit ODTUx3 to a corresponding timeslot in an optical channel data tributary unit group ODTUG3 for transport through the optical transport network.

Optionally, the step of mapping and multiplexing the optical data tributary unit ODTUx3 to a corresponding timeslot in an optical channel data tributary unit group ODTUG3 may include:

mapping the optical channel data tributary unit group ODTUG3 to an optical channel payload unit OPU3;

mapping the optical channel payload unit OPU3 to an optical channel data unit ODU3;

mapping the optical channel data unit ODU3 to an optical channel transport unit OTU3 for transport through the optical transport network.

Optionally, a frame format of 4 rows and 4080 columns may be used in the setting of the frame structures of the optical channel payload unit OPUx, the optical channel data unit ODUx and the optical channel transport unit OTUx of the constant-bit-rate CBR5G rate-level signals transported through the 5G path of the optical channel layer; wherein for the frame structure of the optical channel transport unit OTUx, the first 16 columns are overhead bytes, the last 255 columns are FEC check bytes, and the middle 3808 columns are payloads of a constant-bit-rate 5G signal, wherein in the first row, columns 1~7 are overhead bytes for frame locating, and columns 8~14 are OTUx overhead bytes, and in the second to fourth rows, columns 1~14 are ODUx overhead bytes, and columns 15 and 16 are OPUx overhead bytes; the rate of the OPUx is 4 976 640 kbit/±20 ppm, the rate of the ODUx is 4 997 550 kbit/±20 ppm, and the rate of the OTUx is 5 332 114 kbit/±20 ppm.

Another embodiment of the invention provides a signal transport device applied in an optical transport network, which may include:

an optical channel payload unit OPUx adapted to encapsulate constant-bit-rate CBR5G rate-level signals transported and mapped from the optical channel layer as well as corresponding overheads;

an optical channel data unit ODUx adapted to encapsulate a channel layer connection overhead of the optical channel payload unit OPUx;

a control unit adapted to map and multiplex, according to frame structures of the optical channel payload unit OPUx and the optical channel data unit ODUx, the constant-bit-rate CBR5G rate-level signals to the optical channel payload unit OPUx and the optical channel data unit ODUx for transport through the optical transport network.

Optionally, the signal transport device may further include:

an optical channel transport unit OTUx, adapted to transport the constant-bit-rate CBR5G rate-level signals along a 5G path of the optical channel layer;

Optionally, the control unit may include:

a mapping processing unit of an optical channel payload unit OPUx, adapted to map the constant-bit-rate CBR5G rate-level signals to the optical channel payload unit OPUx;

a mapping processing unit of an optical channel data unit ODUx adapted to map the optical channel payload unit OPUx to the optical channel data unit ODUx;

a mapping processing unit of an optical channel transport unit OTUx adapted to map the optical channel data unit ODUx to the optical channel transport unit OTUx for transport through the optical transport network.

Optionally, the signal transport device may further include:

an optical data tributary unit ODTUx2, adapted to map and multiplex the constant-bit-rate CBR5G rate-level signals transported through a 5G path to a 10G path;

Optionally, the control unit may include:

a mapping processing unit of an optical channel payload unit OPUx, adapted to map the constant-bit-rate CBR5G rate-level signals to the optical channel payload unit OPUx;

a mapping processing unit of an optical channel data unit ODUx, adapted to map the optical channel payload unit OPUx to the optical channel data unit ODUx;

a mapping processing unit of an optical data tributary unit ODTUx2, adapted to map the optical channel data unit ODUx to the optical data tributary unit ODTUx2;

a multiplexing processing unit of an optical channel data tributary unit group ODTUG2, adapted to multiplex the optical data tributary unit ODTUx2 to a corresponding timeslot of an optical channel data tributary unit group ODTUG2, for transport through the optical transport network.

Optionally, the multiplexing processing unit of an optical channel data tributary unit group ODTUG2 may include:

a mapping processing unit of an optical channel payload unit OPU2, adapted to map the optical channel data tributary unit group ODTUG2 to the optical channel payload unit OPU2;

a mapping processing unit of an optical channel data unit ODU2, adapted to map the optical channel payload unit OPU2 to the optical channel data unit ODU2;

a mapping processing unit of an optical channel transport unit OTU2, adapted to map the optical channel data unit ODU2 to the optical channel transport unit OTU2 for transport through the optical transport network.

Optionally, the multiplexing processing unit of an optical channel data tributary unit group ODTUG2 may include:

a mapping processing unit of an optical channel payload unit OPU2, adapted to map the optical channel data tributary unit group ODTUG2 to the optical channel payload unit OPU2;

a mapping processing unit of an optical channel data unit ODU2, adapted to map the optical channel payload unit OPU2 to the optical channel data unit ODU2;

a multiplexing processing unit of an optical channel data tributary unit group ODTUG3, adapted to map the optical channel data unit ODU2 to the optical channel data tributary unit group ODTUG3.

a mapping processing unit of an optical channel payload unit OPU3, adapted to map and multiplex the optical channel data tributary unit group ODTUG3 to the optical channel payload unit OPU3;

a mapping processing unit of an optical channel data unit ODU3, adapted to map the optical channel payload unit OPU3 to the optical channel data unit ODU3;

a mapping processing unit of an optical channel transport unit OTU3, adapted to map the optical channel data unit ODU3 to the optical channel transport unit OTU3 for transport through the optical transport network.

Optionally, the signal transport device may further include:

an optical data tributary unit ODTUx3 adapted to map and multiplex the constant-bit-rate CBR5G rate-level signals transported through a 5G path to a 40G path;

Optionally, the control unit may include:

a mapping unit of an optical channel payload unit OPUx, adapted to map the constant-bit-rate CBR5G rate-level signals to the optical channel payload unit OPUx;

a mapping unit of an optical channel data unit ODUx, adapted to map the optical channel payload unit OPUx to the frame structure of the optical channel data unit ODUx;

a mapping processing unit of an optical data tributary unit ODTUx3, adapted to map the optical channel data unit ODUx to the optical data tributary unit ODTUx3;

a multiplexing processing unit of an optical channel data tributary unit group ODTUG3, adapted to map the optical data tributary unit ODTUx3 to a corresponding timeslot in the optical channel data tributary unit group ODTUG3 for transport through the optical transport network.

Optionally, the multiplexing processing unit of an optical channel data tributary unit group ODTUG3 may include:

a mapping processing unit of an optical channel payload unit OPU3, adapted to map the optical channel data tributary unit group ODTUG3 to the optical channel payload unit OPU3;

a mapping processing unit of an optical channel data unit ODU3, adapted to map the optical channel payload unit OPU3 to the optical channel data unit ODU3;

a mapping processing unit of an optical channel transport unit OTU3, adapted to map the optical channel data unit ODU3 to the optical channel transport unit OTU3 for transport through the optical transport network.

Optionally, a frame format of 4 rows and 4080 columns may be used in the setting of the optical channel payload unit OPUx, the optical channel data unit ODUx and the optical channel transport unit OTUx; wherein for the frame structure of the optical channel transport unit OTUx, the first 16 columns are overhead bytes, the last 255 columns are FEC check bytes, and the middle 3808 columns are payloads of constant-bit-rate CBR5G rate-level signals, wherein in the first row, columns 1~7 are overhead bytes for frame locating, and columns 8~14 are OTUx overhead bytes, and in the second through fourth rows, columns 1~14 are ODUx overhead bytes, and columns 15 and 16 are OPUx overhead bytes; the rate of the OPUx is 4 976 640 kbit/s±20 ppm, the rate of the ODUx is 4 997 550 kbit/s±20 ppm, and the rate of the OTUx is 5 332 114 kbit/s±20 ppm.

The embodiments of the present invention are advantageous in the following aspects:

At least one embodiment of the present invention provides OPUx/ODUx/OTUx for transporting CBR5G rate-level signals in the OTN, and thus enable transparent transport of the CBRG5 signals.

At least one embodiment of the present invention provide ODUx for transporting CBR5G rate-level signals, and thus enable the direct scheduling, supervision and management on the CBR5G signals in the OTN.

With data frame structures of the above OPUx/ODUx/OTUx, At least one embodiments of the present invention further improves the mapping and multiplexing of the OTM (Optical Transport Module), enables the multiplexing, convergence and transport of a number of CBR5G signals, and utilizes the OTN bandwidth effectively.

DETAILED DESCRIPTION

A signal transport method and device according to embodiments of the present invention can be used to map CBR5Gbps (simply referred to as CBR5G) signals to an OTN for transparent transport to achieve direct scheduling, supervision and management for CBR5G granularity signals in the OTN, to improve the OTM mapping and multiplexing (or multiplexing and mapping) structure, and to increase the flexibility of mapping and multiplexing client signals.

Figures 1, 2:
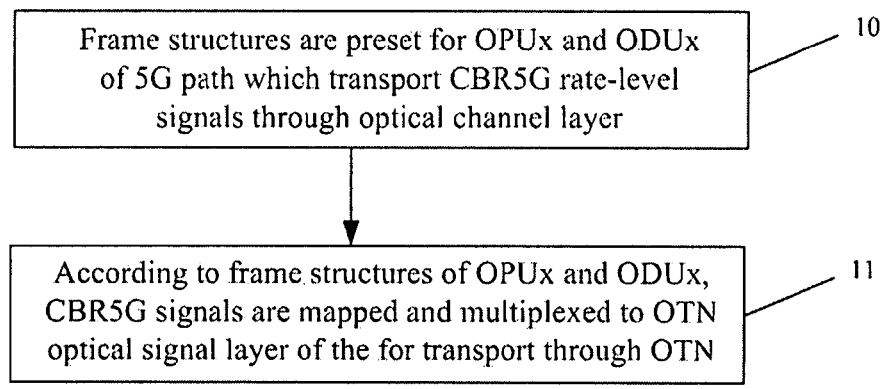
FIG. 1 is a schematic diagram illustrating a frame structure for the use of the virtual cascade technology to transport CBR5G signals in the prior art.
FIG. 2 is a flow diagram of a message transport method according to the embodiments of the present invention.

Referring to FIG. 2, it is a flow diagram of a signal transport method according to embodiments of the present invention.

Firstly in step 10, frame structures are preset for an optical channel payload unit OPUx and an optical channel data unit ODUx of a 5G path which transports CBR5G rate-level signals through an optical channel (Och) layer. In a specific implementation, the frame structures can be designed according to a data frame structure preset in a relevant standard protocol, such as the G.709 protocol, etc.

Then in step 11, according to the frame structures of the optical channel payload unit OPUx and the optical channel data unit ODUx, the CBR5G signals are mapped and multiplexed to the optical signal layer of the OTN for transport through the OTN.

In the prior art, only transport modes of 2.5G, 10G and 40G rate levels are preset. That is, in the prior art, just three signal mapping transport paths of 2.5G, 10G and 40G are implemented in the OTN. The embodiments of the present invention add a 5G, signal mapping transport path. Through presetting the frame structures of the optical channel payload unit OPUx and the optical channel data unit ODUx for the CBR5G signals of the 5G path, and mapping and multiplexing the CBR5G granular signals to the OTN according to the frame structures for transparent transport of the CBR5G signals. Due to the ODUx preset specially for CBR5G signals, the embodiments of the present invention can implement the direct scheduling, supervision and management for the CBR5G signals.

Hereinafter, the present invention will be detailed with reference to the embodiments thereof.

Figure 3:
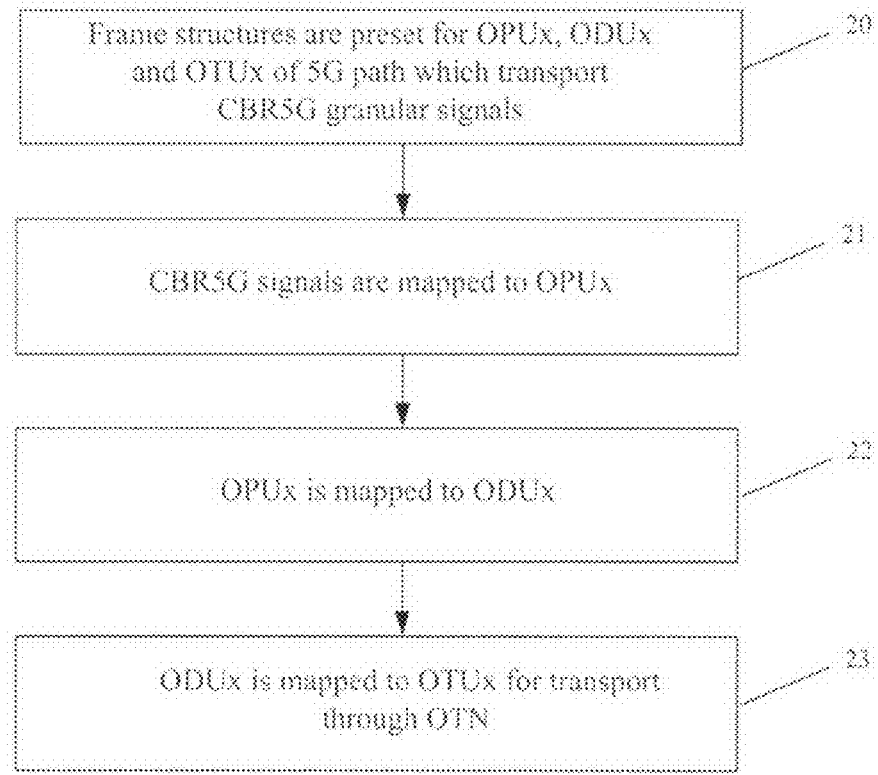
FIG. 3 is a flow diagram of a first embodiment of the message transport method according to the present invention.

FIG. 3 is a flow diagram of a first embodiment of the message transport method according to the present invention.

Figure 4:
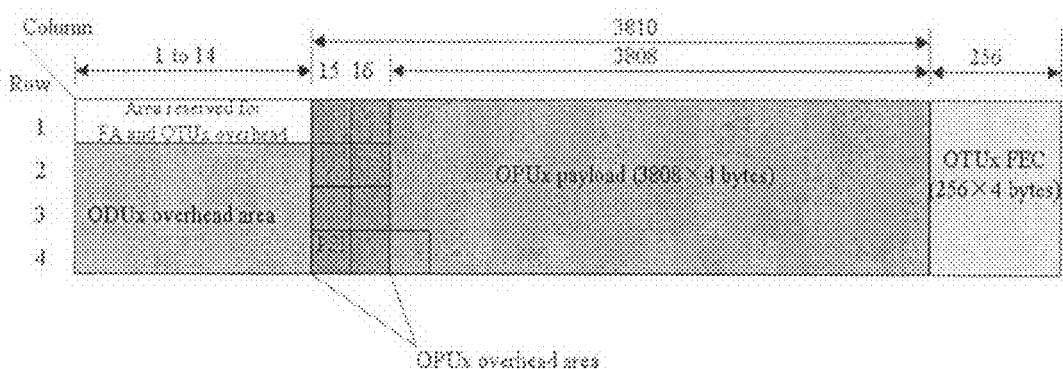
FIG. 4 is a schematic structure diagram of OPUx/ODUx/OTUx frames preset according to an embodiment of the present invention.

In the first embodiment, in step 20, basic OPU, ODU and OTU for the CBR5G granular signals of the 5G path added in the OTN are preset, which are referred to as OPUx, ODUx, OTUx respectively for convenience of the description. In a specific implementation, they may be designed according to the G.709 protocol of the conventional OTN data encapsulation protocol standard. Particularly, the frame structures of the OPUx, ODUx and OTUx are as shown in FIG. 4, which comply with the frame structures of OPUk/ODUk/OTUk defined in the G.709 protocol, and OPUx overhead, ODUx overhead, OTUx overhead and FA (Frame Alignment) overhead also comply with the G.709 protocol.

In details, the optical channel transport unit OTUx adopts a frame format of 4 rows and 4080 columns. Particularly, the first 16 columns are overhead bytes, the last 255 columns are FEC check bytes, and the middle 3808 columns are CBR5G signal payload, wherein the first row, columns 1~7 are overhead bytes for frame locating, and columns 8~14 are OTUx overhead bytes; and in the second through fourth rows, columns 1~14 are ODUx overhead bytes, and columns 15~16 are OPUx overhead bytes.

Here, the rate of the OPUx is:

$$2 \times OPU1 = 2 \times 2\,488\,320 \text{ kbit/s} \pm 20 \text{ ppm} = 4\,976\,640 \text{ kbit/s} \pm 20 \text{ ppm}.$$

The rate of the ODUx is:

$$2 \times ODU1 = 2 \times 239/238 \times 2\,488\,320 \text{ kbit/s} \pm 20 \text{ ppm} = 4\,997\,550 \text{ kbit/s} \pm 20 \text{ ppm}.$$

The rate of the OTUx is:

2×OTU1=2×255/238×2 488 320 kbit/s±20 ppm=5 332 114 kbit/s±20 ppm.

Figures 5, 6:
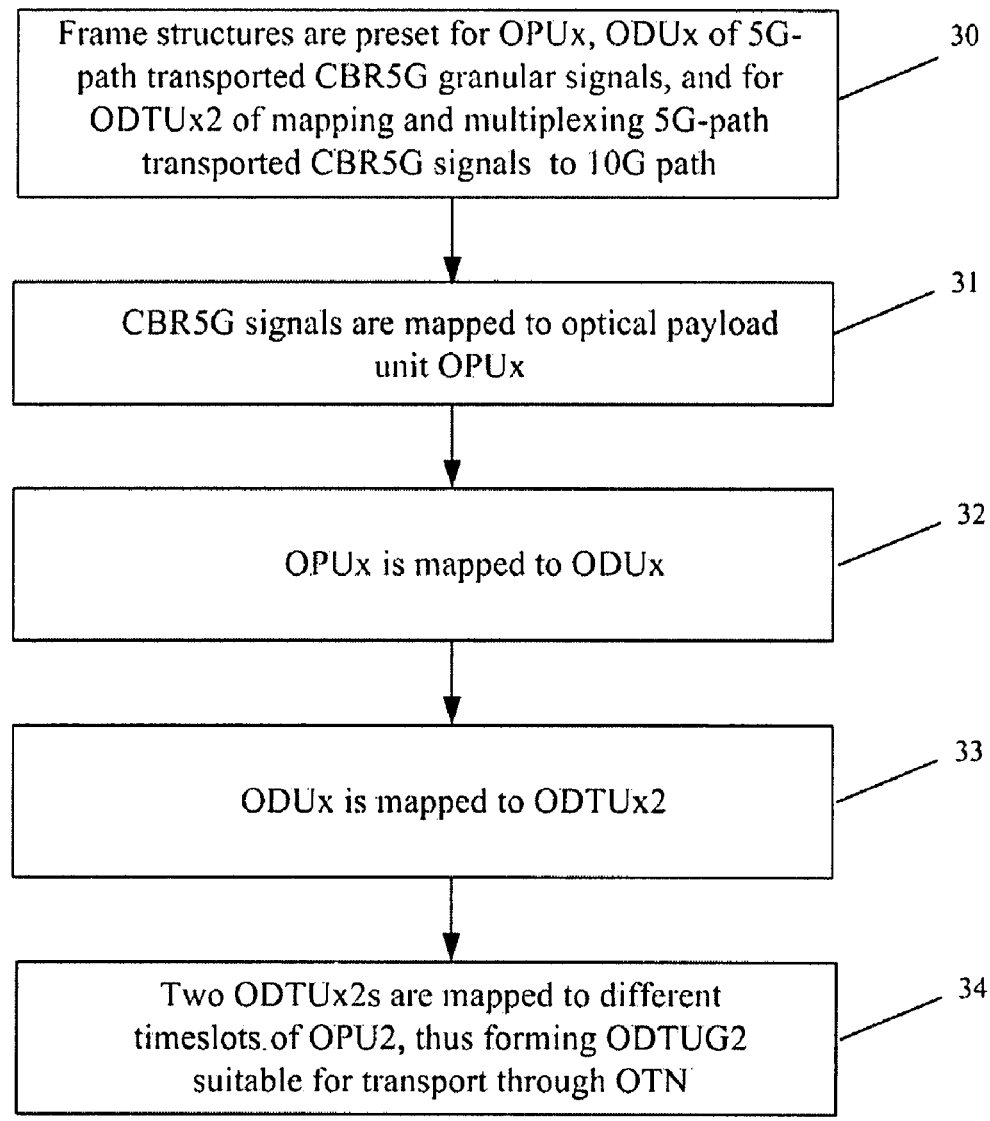
FIG. 5 is a schematic structure diagram of an OPUx frame preset according to an embodiment of the present invention.
FIG. 6 is a flow diagram of a second embodiment of the message transport method according to the present invention.

Then in step 21, the CBR5G signals are mapped and multiplexed to the optical channel payload unit OPUx. Referring to FIG. 5, the payload area of the OPUx has 15231 bytes arranged in 4 rows, and the OPUx further includes one positive justification opportunity PJO, one negative justification opportunity NJO, three JCs, three RESes and one PSI. The definitions of JC, PSI, NJO and PJO are the same as in the G.709. It can be seen that the allowable mapping rate error for the OPUx is ±1/15232=±65 ppm. Since the OPUx itself has an error of ±20 ppm, the OPUx can allow a rate error of ±40 ppm for the CBR5G signals. There are two methods for mapping the CBR5G signals to the OPUx, i.e., asynchronous mapping and synchronous mapping, as well known to those skilled in the art, which will not be further described here. For details on the implementations thereof, see Section 17.1 of the G.709.

In step 22, the optical channel payload unit OPUx is mapped to the optical channel data unit ODUx. In a specific implementation, a channel connection overhead corresponding to the optical channel payload unit OPUx can be added, i.e., a mapping to the ODUx frame;

Finally in step 23, the optical channel data unit ODUx is mapped to the optical channel transport unit OTUx for transport through the OTN.

The above description has been made as to transporting the CBR5G signals of the 5G path. In fact, based on the above OPUx and ODUx frame structures, CBR5G signals may be mapped and multiplexed to a higher-rate path for transport, e.g, through a 10G or 40G path for transport, that is, the ODUx may be mapped and multiplexed to an OPU2 or OPU3 for transport.

FIG. 6 is a flow diagram of a second embodiment of the message transport method according to the present invention.

In the second embodiment, in step 30, an optical data tributary unit ODTUx2 is preset to map and multiplex the CBR5G rate-level signals of the 5G path transported through an optical channel layer to a 10G path, in addition to presetting the above OPUx and ODUx frame structures.

Figure 7:
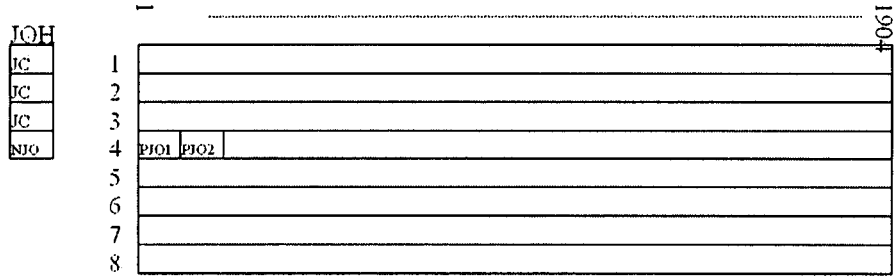
FIG. 7 is a schematic structure diagram of an ODTUx2 frame preset according to an embodiment of the present invention.

FIG. 7 illustrates an ODTUx2 frame structure, a 1904×4×2 structure with one justification overhead JOH. As shown, the ODTUx2 has one negative justification opportunity NJO and two positive justification opportunities PJO1, PJO2. The definition of JC is in accordance with the definition in G.709.

Furthermore, it can be known from the prior art that the rate of the OPU2 rate is:

238/237×4×2 488 320 kbit/s±20 ppm=9 995 280 kbit/s±20 ppm.

An upper limit for the rate of the ODTUG2 is:

(3808×4+1)/(3808×4)×9 995 280 kbit/s±20 ppm=9 995 936 kbit/s±20 ppm.

A lower limit for the rate of the ODTUG2 is:

(3808×4−2)/(3808×4)×9 995 280 kbit/s±20 ppm=9 993 968 kbit/s±20 ppm.

The rate of the two ODUxes is: 2×4 997 550 kbit/s±20 ppm=9 995 100 kbit/s±20 ppm.

Therefore, one ODTUG2 can accommodate two ODTUx2s, that is, when multiplexing the ODUxes to the ODU2 through ODTUx2s, the two ODTUx2s can be multiplexed to one ODTUG2.

Figure 8:
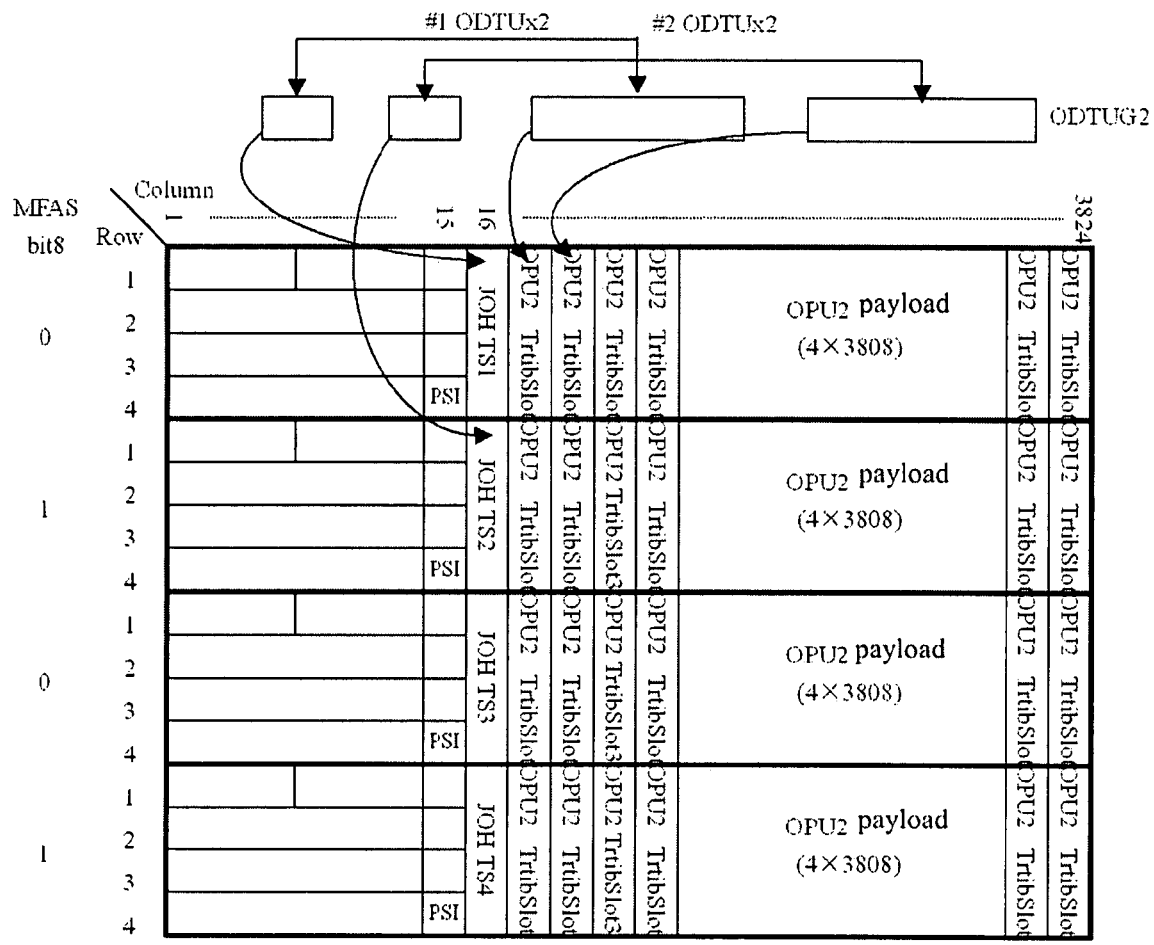
FIG. 8 is a schematic diagram illustrating the mapping and multiplexing of ODTUx2 to ODTUG2 timeslot according to an embodiment of the present invention.

A specific process for mapping the ODTUx2s to the ODTUG2 is illustrated in FIG. 8. For convenience of the description thereof, the two ODTUx2s in the ODTUG2 are referred to as #1 ODTUx2 and #2 ODTUx2 respectively. When multiplexing the two ODTUx2s to the OPU2, #1 ODTUx2 is mapped to OPU2 TribSlot 1 and OPU2 TribSlot 3, and #2 ODTUx2 is mapped to OPU2 TribSlot2 and OPU2 TribSlot4.

Figure 9:
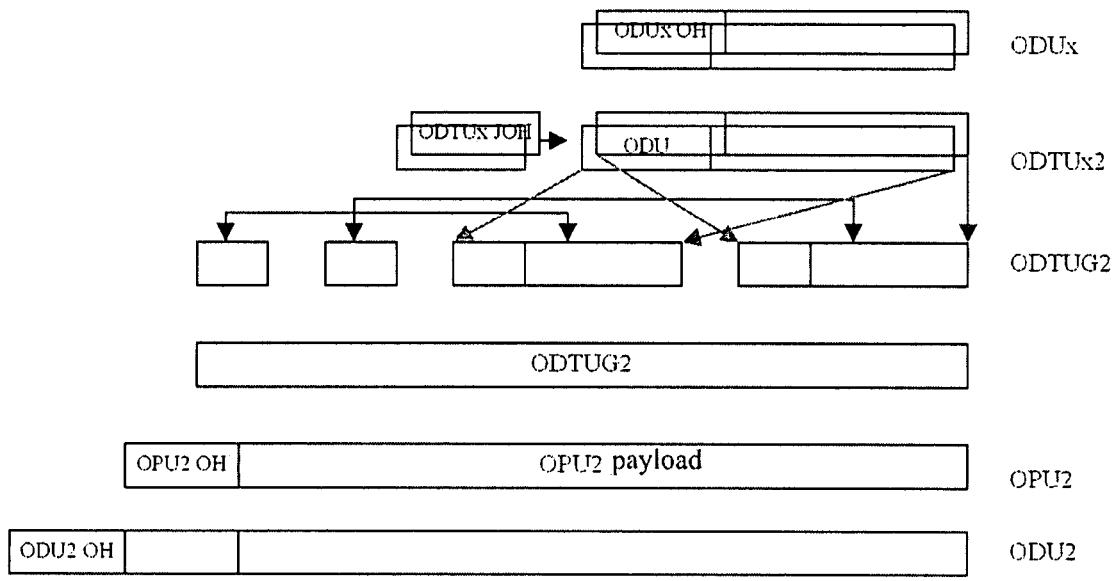
FIG. 9 is a schematic diagram illustrating the mapping and multiplexing of CBR5G signals of a 5G path to a 10G path through a preset ODTUx2.

With reference to FIG. 9 together, a schematic diagram illustrates the mapping and multiplexing of the CBR5G signals of the 5G path to a 10G path through a preset ODTUx2.

As shown in FIG. 9, due to the preset ODTUx2, the ODUx can be mapped to the ODTUx2, then multiplexed to the ODTUG2, and further transported through the OTN through the OPU2/ODU2.

As to the specific transporting of signals, as in the first embodiment, the CBR5G signals are mapped to the optical payload unit OPUx in step 31. Here, the mapping can be implemented with an asynchronous or synchronous method.

Then in step 32, the optical channel payload unit OPUx is mapped to the optical channel data unit ODUx.

In step 33, the ODUx is mapped to the ODTUx2 through adding one ODTUx JOH, and at this time, a justification occurs to the frame structure.

In step 34, the two ODTUx2s are mapped to different timeslots of an OPU2, thus forming the ODTUG2, which is suitable for transport through the OTN.

Note that as for step 34, the two following methods in the prior art can be used in a specific implementation for transport through the OTN.

Figure 10:
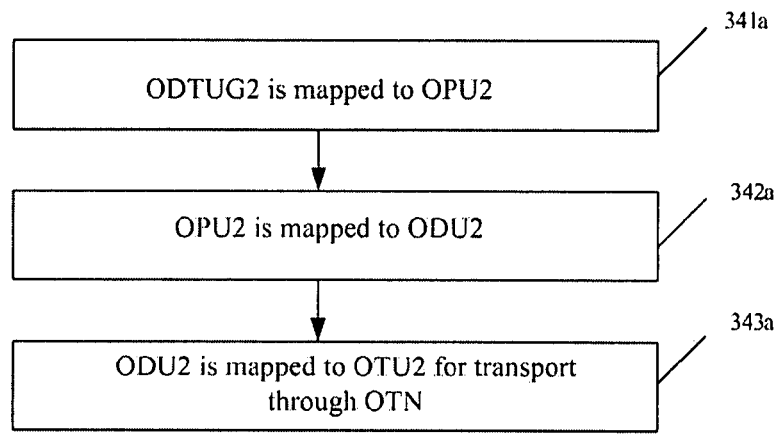
FIG. 10 is a flow diagram of transporting directly CBR5G signals multiplexed to a 10G path on the 10G path.

Referring to FIG. 10, the first method transports the CBR5G signals directly through a 10G path, mainly including the following steps.

Step 341*a*, the ODTUG2s are mapped to the OPU2.

Step 342*a*, the optical channel payload unit OPU2 is mapped to the optical channel data unit ODU2.

Step 343*a*, the optical channel data unit ODU2 is mapped to the optical channel transport unit OTU2 for transport through the OTN.

Figure 11:
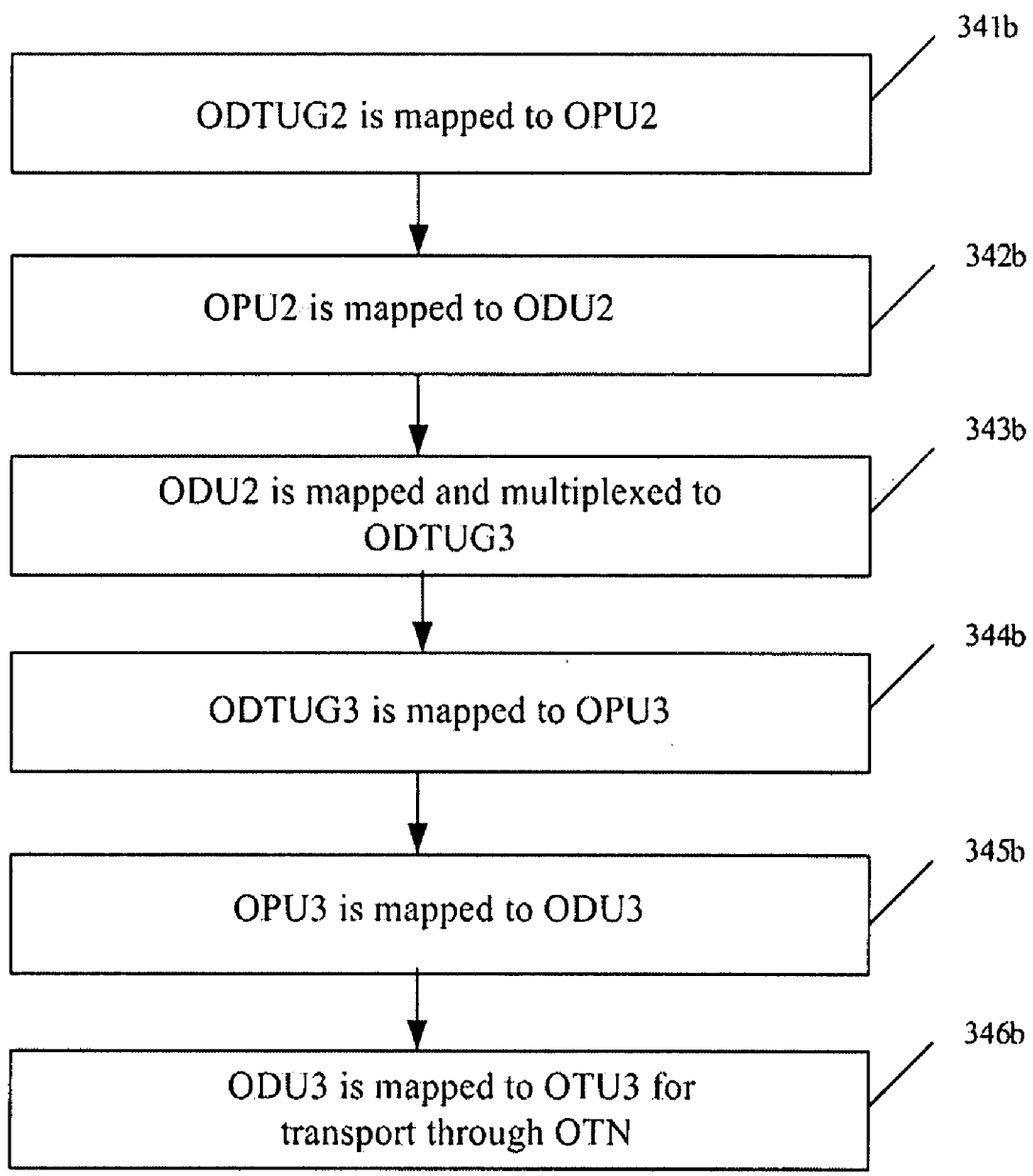
FIG. 11 is a schematic diagram of mapping CBR5G signals which is multiplexed to a 10G path to 40G path for transport.

Referring to FIG. 11, the second method further maps the CBR5G signals to a 40G path at a higher-rate level for transport, mainly including the following steps.

Step 341*b*, the optical channel data tributary unit group ODTUG2 is mapped to an optical channel payload unit OPU2.

Step 342*b*, the optical channel payload unit OPU2 is mapped to an optical channel data unit ODU2.

Step 343*b*, the optical channel data unit ODU2 is mapped to an optical channel data tributary unit group ODTUG3.

Step 344*b*, the optical channel data tributary unit group ODTUG3 is mapped and multiplexed to an optical channel payload unit OPU3.

Step 345*b*, the optical channel payload unit OPU3 is mapped to an optical channel data unit ODU3.

Step 346*b*, the optical channel data unit ODU3 is mapped to an optical channel transport unit OTU3 for transport through the OTN.

Figure 12:
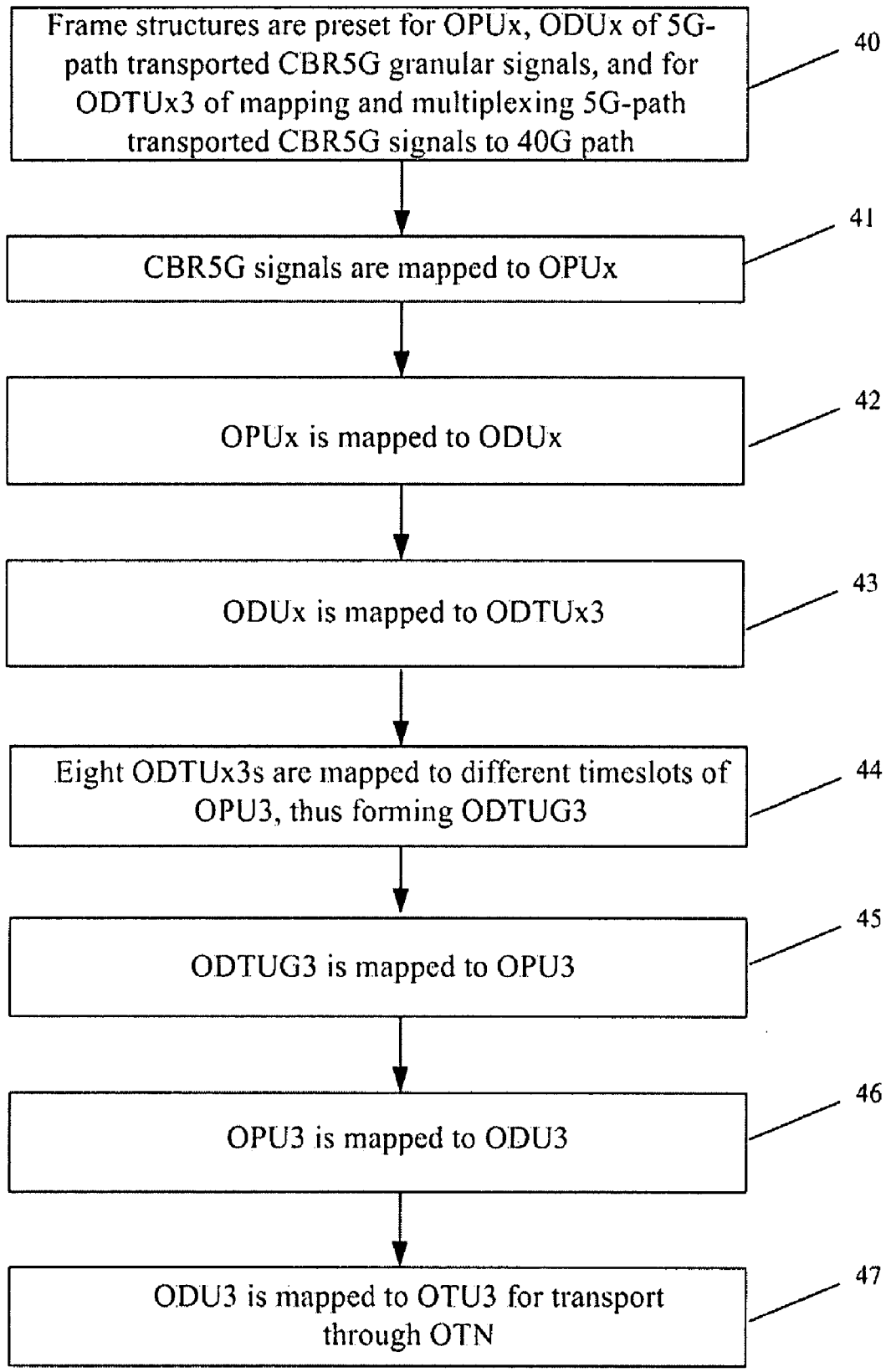
FIG. 12 is a flow diagram of a third embodiment of the message transport method according to the present invention.

FIG. 12 is a flow diagram of a third embodiment of the message transport method according to the present invention.

In the third embodiment, the CBR5G signals of the 5G path is mapped and multiplexed directly to a 40G rate-level path for transport, that is, an optical data tributary unit ODTUx2 is preset to map and multiplex the CBR5G rate-level signals transported through the 5G path in the optical channel layer to a 40G path, in addition to presetting the above OPUx and ODUx frame structures.

Figure 13:
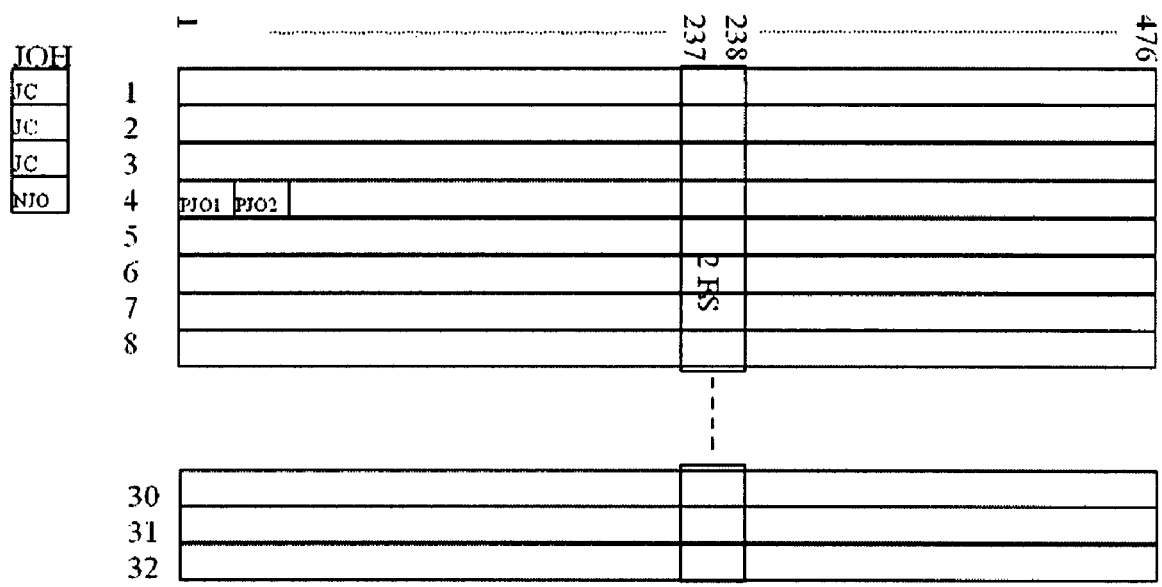
FIG. 13 is a schematic diagram structure of an ODTUx3 frame preset according to an embodiment of the present invention.

Referring to FIG. 13, the frame structure of the ODTUx3 is a 476×4×8 structure with one justification overhead JOH.

It can be seen from FIG. 13 that the ODTUx3 has one negative justification opportunity NJO and two positive justification opportunities PJO1, PJO2. Here, the definition of JC complies with the G.709. In addition, note that the ODTUx3 has two columns of FS bytes.

Furthermore, it can be known from the prior art that the rate of the OPU3 is:

238/236×16×2 488 320 kbit/s±20 ppm=40 150 519 kbit/s±20 ppm.

An upper limit for the rate of the ODTUG3 is:

((3808−16)×4+1)/(3808×4)×40 150 519 kbit/s±20 ppm=39 984 455 kbit/s±20 ppm.

A lower limit for the rate of the ODTUG3 is:

((3808−16)×4−2)/(3808×4)×40 150 519 kbit/s±20 ppm=39 976 547 kbit/s±20 ppm.

The rate of the eight ODUxes is:

8×4 997 550 kbit/s±20 ppm=39 980 400 kbit/s±20 ppm.

It can be known from the above that one ODTUG3 can accommodate eight ODUTx3s. That is, when multiplexing the ODUxes to the ODU3 through the ODTUx3s, the eight ODTUx2s are multiplexed to one ODTUG3.

Figure 14:
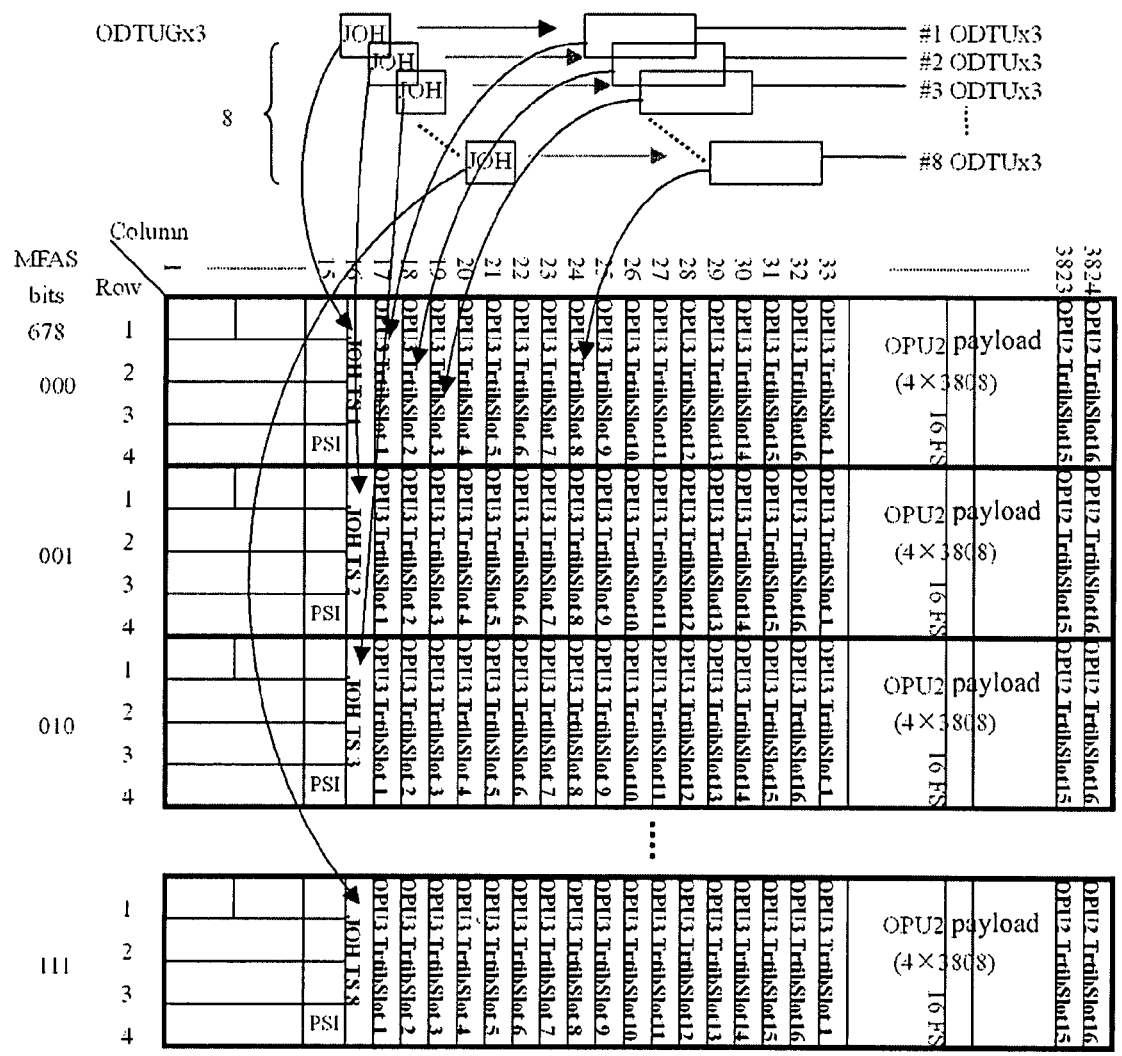
FIG. 14 is a schematic diagram illustrating the mapping and multiplexing of ODTUx3 to ODTUG3 timeslots according to an embodiment of the present invention.

A specific process for mapping the ODTUx3 to the ODTUG3 is illustrated in FIG. 14. For convenience of the description thereof, the eight ODTUx3s in the ODTUG3 are referred to as #1 ODTUx3, #2 ODTUx3, . . . , #8 ODTUx3 respectively. When multiplexing the eight ODTUx3s to the OPU3, #1 ODTUx3 is mapped to OPU3 TribSlot 1 and OPU2 TribSlot 9, #2 ODTUx3 is mapped to OPU3 TribSlot2 and OPU2 TribSlot10, . . . , and #8 ODTUx3 is mapped to OPU3 TribSlot 8 and OP3 TribSlot 16.

Figure 15:
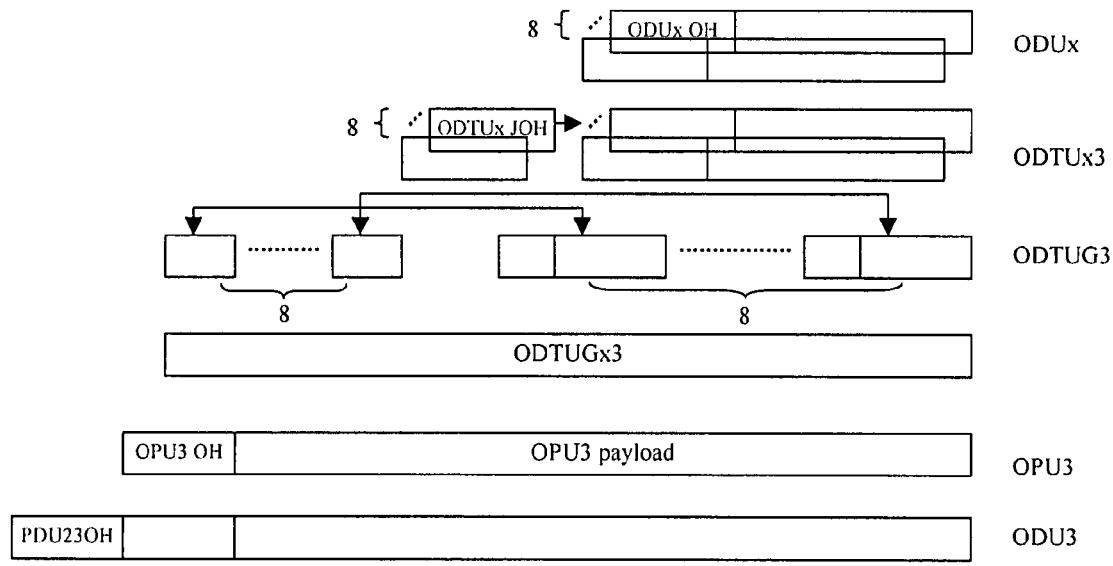
FIG. 15 is a schematic diagram illustrating the direct mapping and multiplexing of CBR5G signals of a 5G path to a 40G path through a preset ODTUx3.

Referring to FIG. 15, it is a schematic diagram illustrating the direct mapping and multiplexing of CBR5G signals of a 5G path to a 40G path through a preset ODTUx3 according to an embodiment of the present invention.

As shown, according to the embodiment of the invention, due to the preset ODTUx3, the ODUx may be mapped to the ODTUx3, and then multiplexed to the ODTUG3 for further transport over the OTN through the OPU3/ODU3.

As for the specific transporting of the signals, in step 41, the CBR5G signals are mapped to the optical payload unit OPUx, as in the first and the second embodiments. In a specific implementation, the mapping may be implemented with an asynchronous or synchronous method.

Then in step 42, the optical channel payload unit OPUx is mapped to the optical channel data unit ODUx.

In step 43, the ODUx is mapped to the ODTUx3 through adding one ODTUx JOH thereto, and at this time, the justification occurs to the frame structure.

In step 44, the eight optical data tributary unit ODTUx3s are mapped and multiplexed to respective timeslots which constitute an optical channel data tributary unit group ODTUG3.

In step 45, the optical channel data tributary unit group ODTUG3 is mapped to an optical channel payload unit OPU3.

In step 46, the optical channel payload unit OPU3 is mapped to an optical channel data unit ODU3.

In step 47, the optical channel data unit ODU3 is mapped to an optical channel transport unit OTU3 for transport through the OTN.

Figure 16:
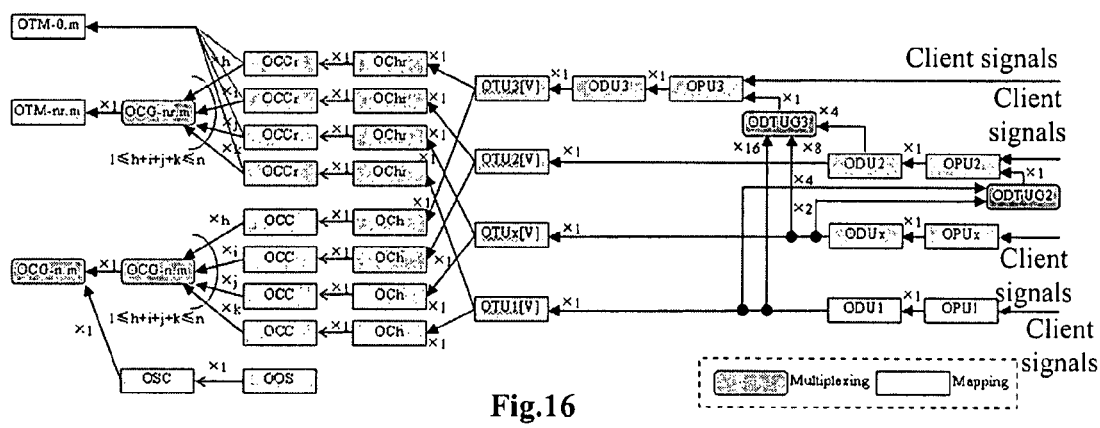
FIG. 16 is a schematic diagram illustrating an OTM mapping and multiplexing path added according to an embodiment of the present invention.

The present invention has been described above by way of the three embodiments, and with the 5G path added in the embodiments, the OTM mapping and multiplexing structure may further be improved. With reference to FIG. 16, the embodiments of the present invention add three mapping and multiplexing paths compared with the prior art:

1. Client signals->OPUx->ODUx->OTUx[V];
2. Client signals->OPUx->ODUx->OTUG2;
3. Client signals->OPUx->ODUx->OTUG3.

Other aspects of the present invention will be described hereinafter.

Figure 17:
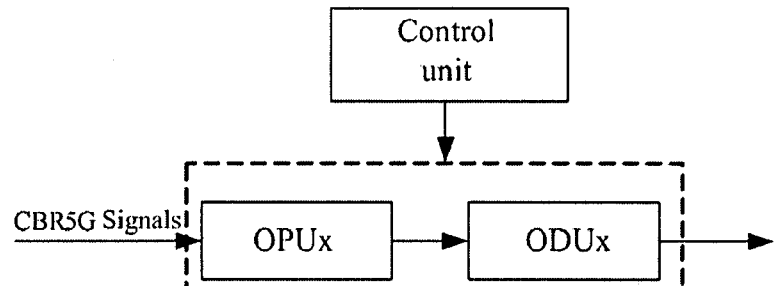
FIG. 17 is a block diagram of a message transport device according to an embodiment of the present invention.

FIG. 17 is a block diagram of a message transport device according to an embodiment of the present invention. As shown, the message transport device primarily includes an optical channel payload unit OPUx, an optical channel data unit ODUx and a control unit.

The Optical channel payload unit OPUx is used to encapsulate client signals of a CBR5G rate level transported and mapped from an optical channel layer as well as a corresponding overhead. Its data frame structure can be designed according to a data frame structure defined in a relevant standard protocol, such as the G.709 protocol, etc., and a specific implementation thereof is shown in FIG. 5.

The optical channel data unit ODUx is used to encapsulate the channel layer connection overhead of the optical channel payload unit OPUx, and its data frame structure can also be designed according to a data frame structure defined in a relevant standard protocol, such as the G.709 protocol, etc.

The control unit is used to map and multiplex CBR5G signals to the optical channel payload unit OPUx and the optical channel data unit ODUx, according to their frame structures, for transport through the OTN.

Figure 18:
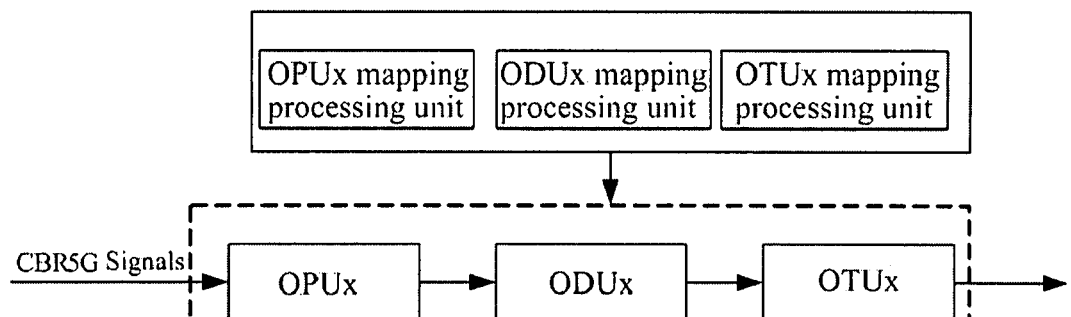
FIG. 18 is a block diagram of a first embodiment of the message transport device according to the present invention.

FIG. 18 is a block diagram for transporting messages through a 5G path by the message transport device according to an embodiment of the present invention. In order to transport CBR5G granular signals through the 5G path of an optical channel layer, the message transport device further includes an optical channel transport unit OTUx used to transport CBR5G rate-level signals through the 5G path of the optical channel layer, a frame structure of which can be designed according to a data frame structure defined in a relevant standard protocol, such as the G.709 protocol, etc., particularly as shown in FIG. 4.

Furthermore, referring to FIG. 18, in order to map and multiplex the CBR5G signals to the 5G path for transport, the control unit includes the following units.

A mapping processing unit of an optical channel payload unit OPUx, used to map the CBR5G signal to the optical channel payload unit OPUx, where the mapping can be implemented with a synchronous or asynchronous method.

A mapping processing unit of an optical channel data unit ODUx, used to map the optical channel payload unit OPUx to the optical channel data unit ODUx. In a specific implementation, the OPUx can be mapped to the ODUx frame simply with addition of a connection overhead corresponding to the optical channel payload unit OPUx.

A mapping processing unit of an optical channel transport unit OTUx, used to map the optical channel data unit ODUx to the optical channel transport unit OTUx for transport through the OTN.

In all, the message transport device according to this embodiment can implement the mapping path in the OTN as follows:

Client signals->OPUx->ODUx->OTUx[V].

With such a mapping transport path, it is possible to achieve a transparent of the CBR5G signals, that is, direct scheduling, supervision and management on the CBR5G signals in the OTN.

Figure 19:
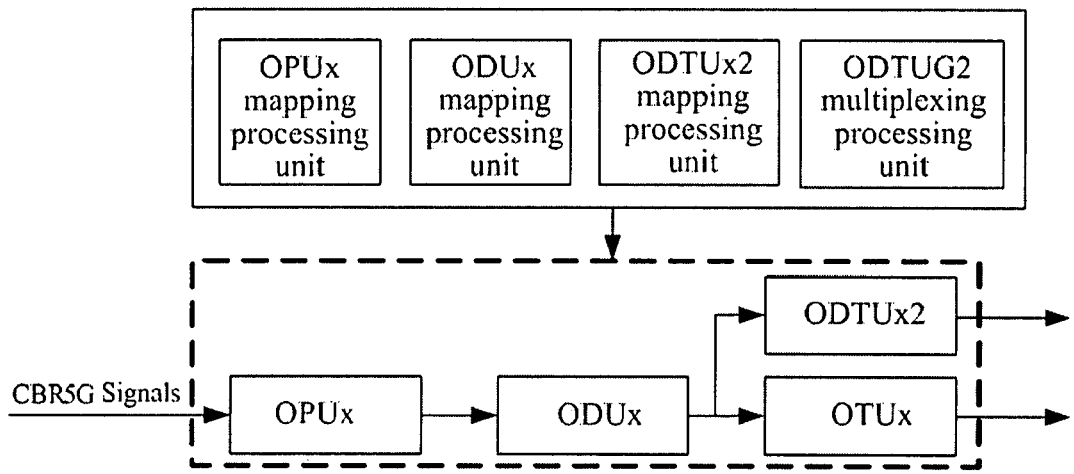
FIG. 19 is a block diagram of a second embodiment of the message transport device according to the present invention.

FIG. 19 is a block diagram of the message transport device according to another embodiment of the present invention.

In this embodiment, signals of a 5G path can be mapped and multiplexed to a 10G path for transport. Accordingly, the message transport device in the embodiment further includes an optical data tributary unit ODTUx2 used to map and multiplex the CBR5G rate-level signals, transported through the 5G path, to the 10G path, a specific frame structure implemented for which is as shown in FIG. 7.

Furthermore, referring to FIG. 19, in order to map and multiplex CBR5G rate-level signals of a 5G path to a 10G path for transport, the control unit in the embodiment includes a mapping processing unit of an optical channel payload unit OPUx, a mapping processing unit of an optical channel data unit ODUx, a mapping processing unit of an optical data tributary unit ODTUx2 and a multiplexing processing unit of an optical channel data tributary unit group ODTUG2.

The mapping processing unit of an optical channel payload unit OPUx is used to map CBR5G signals to the frame structure of the optical channel payload unit OPUx, and a specific implementation can be achieved with a synchronous or asynchronous method.

The mapping processing unit of an optical channel data unit ODUx is used to map the optical channel payload unit OPUx to the frame structure of the optical channel data unit ODUx, and in a specific implementation, the OPUx can be mapped to the ODUx frame simply with addition of a channel connection overhead corresponding to the optical channel payload unit OPUx.

The mapping processing unit of an optical data tributary unit ODTUx2 is used to map the optical channel data unit ODUx to the optical data tributary unit ODTUx2.

The multiplexing processing unit of an optical channel data tributary unit group ODTUG2 is used to multiplex the optical data tributary unit ODTUx2 to a corresponding timeslot for formation of an optical channel data tributary unit group ODTUG2 for transport through the OTN.

Figure 20:
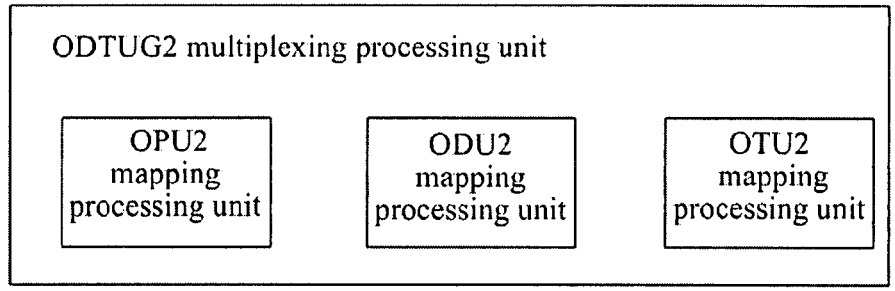
FIG. 20 is a block diagram of a multiplexing processing unit of an optical channel data tributary unit group ODTUG2 shown in FIG. 19.

FIG. 20 is a block diagram of the multiplexing processing unit of an optical channel data tributary unit group ODTUG2 shown in FIG. 19, which is used to transport signals of a 5G path directly through a 10G path. As shown, the multiplexing processing unit of an optical channel data tributary unit group ODTUG2 includes the following units in a specific implementation.

A mapping processing unit of an optical channel payload unit OPU2, used to map the optical channel data tributary unit group ODTUG2 to an optical channel payload unit OPU2.

A mapping processing unit of an optical channel data unit ODU2, used to map the optical channel payload unit OPU2 to an optical channel data unit ODU2.

A mapping processing unit of an optical channel transport unit OTU2, used to map the optical channel data unit ODU2 to an optical channel transport unit OTU2 for transport through the OTN.

Figure 21:
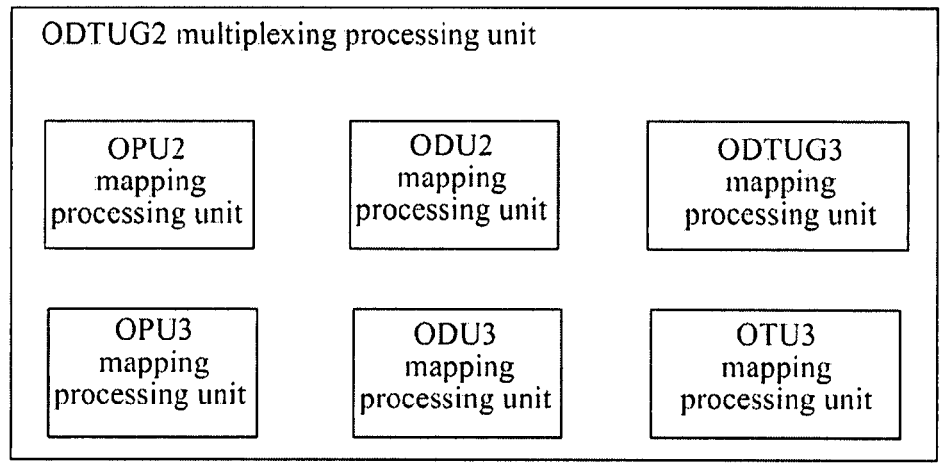
FIG. 21 is another block diagram of a multiplexing processing unit of an optical channel data tributary unit group ODTUG2 shown in FIG. 19.

FIG. 21 is another block diagram of the multiplexing processing unit of an optical channel data tributary unit group ODTUG2 shown in FIG. 19, and as shown, the multiplexing processing unit of an optical channel data tributary unit group ODTUG2 includes the following units in a specific implementation.

A mapping processing unit of an optical channel payload unit OPU2, used to map the optical channel data tributary unit group ODTUG2 to an optical channel payload unit OPU2.

A mapping processing unit of an optical channel data unit ODU2, used to map the optical channel payload unit OPU2 to an optical channel data unit ODU2.

A multiplexing processing unit of an optical channel data tributary unit group ODTUG3, used to map the optical channel data unit ODU2 to an optical channel data tributary unit group ODTUG3.

A mapping processing unit of an optical channel payload unit OPU3, used to map and multiplex the optical channel data tributary unit group ODTUG3 to an optical channel payload unit OPU3.

A mapping processing unit of an optical channel data unit ODU3, used to map the optical channel payload unit OPU3 to an optical channel data unit ODU3.

A mapping processing unit of an optical channel transport unit OTU3, used to map the optical channel data unit ODU3 to an optical channel transport unit OTU3 for transport through the OTN.

The message transport device of the embodiment can implement the mapping path in the OTN as follows:

Client signals->OPUx->ODUx->ODTUG2.

With such a mapping transport path, it is possible to achieve transparent transport of the CBR5G signals, that is, direct scheduling, supervision and management on the CBR5G signals in the OTN.

Figure 22:
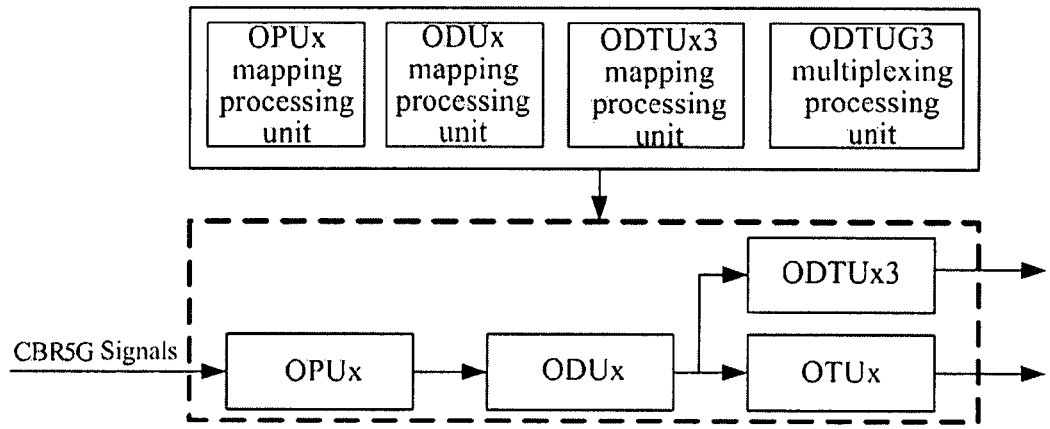
FIG. 22 is a block diagram of a third embodiment of the message transport device according to the present invention.

FIG. 22 is a block diagram of the message transport device according to another embodiment of the present invention.

In this embodiment, it is possible to directly map and multiplex signals of a 5G path to a 40G path for transport, and as shown in FIG. 22, the message transport device further includes an optical data tributary unit ODTUx3 used to map and multiplex CBR5G rate-level signals, transported through a 5G path, to a 40G path.

Furthermore, referring to FIG. 22, in order to map directly CBR5G rate-level signals, transported through a 5G path, to a 40G path for transport, the control unit in this embodiment includes the following units.

A mapping processing unit of an optical channel payload unit OPUx, used to map the CBR5G signals to the optical channel payload unit OPUx, alike with a synchronous or asynchronous method.

A mapping processing unit of an optical channel data unit ODUx, used to map the optical channel payload unit OPUx to the frame structure of the optical channel data unit ODUx.

A mapping processing unit of an optical data tributary unit ODTUx3, used to map the optical channel data unit ODUx to the optical data tributary unit ODTUx3.

A multiplexing processing unit of an optical channel data tributary unit group ODTUG3, used to map the optical data tributary unit ODTUx3 to a corresponding timeslot for formation of an optical channel data tributary unit group ODTUG3 for transport through the OTN.

Figure 23:
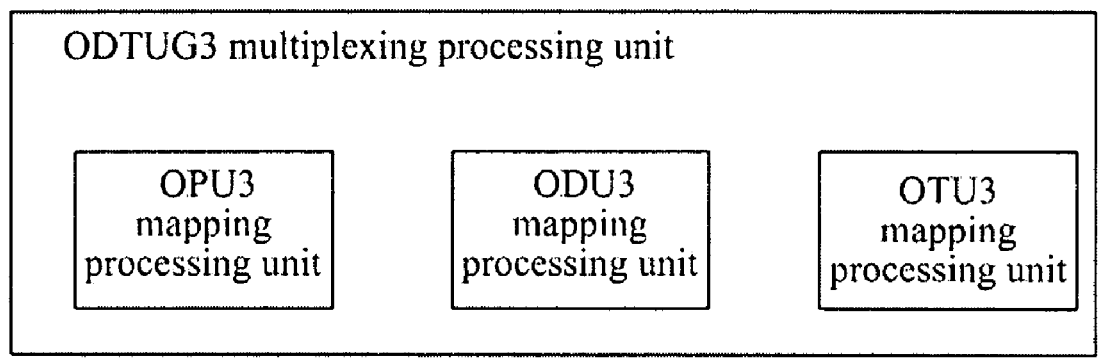
FIG. 23 is a block diagram of a multiplexing processing unit of an optical channel data tributary unit group ODTUG3 shown in FIG. 22.

FIG. 23 is a detailed block diagram of the multiplexing processing unit of an optical channel data tributary unit group ODTUG3 shown in FIG. 22. As shown, the multiplexing processing unit of an optical channel data tributary unit group ODTUG3 includes the following units in a specific implementation:

A mapping processing unit of an optical channel payload unit OPU3, used to map the optical channel data tributary unit group ODTUG3 to an optical channel payload unit OPU3.

A mapping processing unit of an optical channel data unit ODU3, used to map the optical channel payload unit OPU3 to an optical channel data unit ODU3.

A mapping processing unit of an optical channel transport unit OTU3, used to map the optical channel data unit ODU3 to an optical channel transport unit OTU3 for transport through the OTN.

The message transport device according to this embodiment can implement the mapping path in the OTN as follows:

Client signals->OPUx->ODUx->ODTUG3.

With such a mapping transport path, it is possible to achieve transparent transport of the CBR5G signals, that is, direct scheduling, supervision and management on the CBR5G signals in the OTN.

In summary, the embodiments of the present invention enable transparent transport of CBR5G in the OTN with the definitions of the frame structures of OPUx/ODUx/OTUx.

Due to the definition of ODUx, the direct scheduling, supervision and management on CBR5G in the OTN can be enabled.

Due to the improvement of the OTM mapping and multiplexing, it is possible to enable the multiplexing, convergence and transport of a number of CBR5G signals, and thus to utilize the OTN bandwidth effectively.

While the present invention has been described and illustrated with reference to the embodiments thereof and the drawings, it shall be recognized by those skilled in the art that those embodiments and drawings are merely illustrative and not restrictive, that the present invention shall be not limited thereto, and that various modifications and variations can be made thereto in light of the descriptions and the drawings without departing from the sprit and scope of the present invention as defined by the accompanying claims.

What is claimed is:

1. A signal transport method applied in an optical transport network, comprising:
presetting frame structures for an optical channel payload unit OPUx and an optical channel data unit ODUx of a 5G path transporting constant-bit-rate CBR5G rate-level signals in an optical channel layer; and
according to the frame structures of the optical channel payload unit OPUx and the optical channel data unit ODUx, mapping and multiplexing the constant-bit-rate CBR5G rate-level signals to the optical channel layer of the optical transport network for transport through the optical transport network,
wherein the step of presetting further comprises:
presetting an optical data tributary unit ODTUx2 to map and multiplex the constant-bit-rate CBR5G rate-level signals transported through the 5G path in the optical channel layer to a 10G path; and
wherein the step of mapping and multiplexing the constant-bit-rate CBR5G signals comprises:
mapping the constant-bit-rate CBR5G rate-level signals to the optical channel payload unit OPUx;
mapping the optical channel payload unit OPUx to the optical channel data unit ODUx;
mapping the optical channel data unit ODUx to the optical data tributary unit ODTUx2; and
mapping and multiplexing the optical data tributary unit ODTUx2 to a corresponding timeslot of an optical channel data tributary unit group ODTUG2 for transport through the optical transport network.

2. The signal transport method according to claim 1, wherein the step of presetting further comprises:
presetting an optical channel transport unit OTUx of the 5G path transporting the constant-bit-rate CBR5G rate-level signals in the optical channel layer; and
wherein the step of mapping and multiplexing comprises:
mapping the constant-bit-rate CBR5G rate-level signals to the optical channel payload unit OPUx;
mapping the optical channel payload unit OPUx to the optical channel data unit ODUx; and
mapping the optical channel data unit ODUx to the optical channel transport unit OTUx for transport through the optical transport network.

3. The method according claim 2, wherein a frame format of 4 rows and 4080 columns is used in the setting of the frame structures of the optical channel payload unit OPUx, the optical channel data unit ODUx and the optical channel transport unit OTUx of the constant-bit-rate CBR5G rate-level signals transported through the 5G path of the optical channel layer; wherein for the frame structure of the optical channel transport unit OTUx, the first 16 columns are overhead bytes, the last 255 columns are FEC check bytes, and the middle 3808 columns are payloads of a constant-bit-rate 5G signal, wherein in the first row, columns 1-7 are overhead bytes for frame locating, and columns 8-14 are OTUx overhead bytes, and in the second to fourth rows, columns 1-14 are ODUx overhead bytes, and columns 15 and 16 are OPUx overhead bytes; the rate of the OPUx is 4 976 640 kbit/s±20 ppm, the rate of the ODUx is 4 997 550 kbit/s±20 ppm, and the rate of the OTUx is 5 332 114 kbit/s±20 ppm.

4. The signal transport method according to claim 1, wherein the step of mapping and multiplexing the optical data tributary unit ODTUx2 to a corresponding timeslot of an optical channel data tributary unit group ODTUG2 comprises:
mapping the optical channel data tributary unit group ODTUG2 to an optical channel payload unit OPU2;
mapping the optical channel payload unit OPU2 to an optical channel data unit ODU2; and
mapping the optical channel data unit ODU2 to an optical channel transport unit OTU2 for transport through the optical transport network.

5. The signal transport method according to claim 1, wherein the step of mapping and multiplexing the optical data tributary unit ODTUx2 to a corresponding timeslot of an optical channel data tributary unit group ODTUG2 comprises:
mapping the optical channel data tributary unit group ODTUG2 to an optical channel payload unit OPU2;
mapping the optical channel payload unit OPU2 to an optical channel data unit ODU2;
mapping the optical channel data unit ODU2 to an optical channel data tributary unit group ODTUG3;
mapping and multiplexing the optical channel data tributary unit group ODTUG3 to an optical channel payload unit OPU3;
mapping the optical channel payload unit OPU3 to an optical channel data unit ODU3; and
mapping the optical channel data unit ODU3 to an optical channel transport unit OTU3 for transport through the optical transport network.

6. The signal transport method according to claim 1, wherein the step of presetting further comprises:
presetting an optical data tributary unit ODTUx3 to map and multiplex the constant-bit-rate CBR5G rate-level signals transported through the 5G path in the optical channel layer to a 40G path; and
wherein the step of mapping and multiplexing comprises:
mapping the constant-bit-rate CBR5G rate-level signals to the optical channel payload unit OPUx;
mapping the optical channel payload unit OPUx to the optical channel data unit ODUx;
mapping the optical channel data unit ODUx to the optical data tributary unit ODTUx3; and
mapping and multiplexing the optical data tributary unit ODTUx3 to a corresponding timeslot in an optical channel data tributary unit group ODTUG3 for transport through the optical transport network.

7. The signal transport method according to claim 6, wherein the step of mapping and multiplexing the optical data tributary unit ODTUx3 to a corresponding timeslot in an optical channel data tributary unit group ODTUG3 comprises:

mapping the optical channel data tributary unit group ODTUG3 to an optical channel payload unit OPU3;

mapping the optical channel payload unit OPU3 to an optical channel data unit ODU3; and mapping the optical channel data unit ODU3 to an optical channel transport unit OTU3 for transport through the optical transport network.

8. The signal transport method according to claim 1, wherein a frame format of 4 rows and 4080 columns is used in the setting of the frame structures of the optical channel payload unit OPUx and the optical channel data unit ODUx.

9. The signal transport method according to claim 1, wherein the step of presetting further comprises:

presetting an optical channel transport unit OTUx of the 5G path transporting the constant-bit-rate CBR5G rate-level signals in the optical channel layer; and wherein the step of mapping and multiplexing comprises:

mapping the constant-bit-rate CBR5G rate-level signals to the optical channel payload unit OPUx;

mapping the optical channel payload unit OPUx to the optical channel data unit ODUx; and mapping the optical channel data unit ODUx to the optical channel transport unit OTUx for transport through the optical transport network.

10. The signal transport method according to claim 1, wherein the step of presetting further comprises:

presetting an optical data tributary unit ODTUx2 to map and multiplex the constant-bit-rate CBR5G rate-level signals transported through the 5G path in the optical channel layer to a 10G path; and wherein the step of mapping and multiplexing comprises:

mapping the constant-bit-rate CBR5G rate-level signals to the optical channel payload unit OPUx;

mapping the optical channel payload unit OPUx to the optical channel data unit ODUx;

mapping the optical channel data unit ODUx to the optical data tributary unit ODTUx2; and mapping and multiplexing the optical data tributary unit ODTUx2 to a corresponding timeslot of an optical channel data tributary unit group ODTUG2 for transport through the optical transport network.

11. A signal transport device applied in an optical transport network, comprising:

an optical channel payload unit OPUx adapted to encapsulate constant-bit-rate CBR5G rate-level signals transported and mapped from the optical channel layer as well as corresponding overheads, wherein the OPUx has a data structure that includes OPUx overhead bits and a OPUx payload unit for transporting the CBR5G signal;

an optical channel data unit ODUx adapted to encapsulate a channel layer connection overhead of the optical channel payload unit OPUx, wherein the ODUx has a data structure that includes ODUx overhead bits, OPUx overhead bits, and a OPUx payload unit for transporting the CBR5G signal;

a control unit adapted to map and multiplex, according to frame structures of the optical channel payload unit OPUx and the optical channel data unit ODUx, the constant-bit-rate CBR5G rate-level signals to the optical channel payload unit OPUx and the optical channel data unit ODUx for transport through the optical transport network; and one of an optical channel transport unit OTUx, adapted to transport the constant-bit-rate CBR5G rate-level signals along a 5G path of the optical channel layer;

an optical data tributary unit ODTUx2 that is adapted to map and multiplex the constant-bit-rate CBR5G rate-level signals transported through a 5G path to a 10G path, or an optical data tributary unit ODTUx3 that is adapted to map and multiplex the constant-bit-rate CBR5G rate-level signals transported through a 5G path to a 40G path.

12. The signal transport device according to claim 11, comprising the optical channel transport unit OTUx, wherein the control unit comprises:

a mapping processing unit of an optical channel payload unit OPUx, adapted to map the constant-bit-rate CBR5G rate-level signals to the optical channel payload unit OPUx;

a mapping processing unit of an optical channel data unit ODUx adapted to map the optical channel payload unit OPUx to the optical channel data unit ODUx; and a mapping processing unit of an optical channel transport unit OTUx adapted to map the optical channel data unit ODUx to the optical channel transport unit OTUx for transport through the optical transport network.

13. The device according to claim 12, wherein a frame format of 4 rows and 4080 columns is used in the setting of the optical channel payload unit OPUx, the optical channel data unit ODUx and the optical channel transport unit OTUx; wherein for the frame structure of the optical channel transport unit OTUx, the first 16 columns are overhead bytes, the last 255 columns are FEC check bytes, and the middle 3808 columns are payloads of constant-bit-rate CBR5G rate-level signals, wherein in the first row, columns 1-7 are overhead bytes for frame locating, and columns 8-14 are OTUx overhead bytes, and in the second through fourth rows, columns 1-14 are ODUx overhead bytes, and columns 15 and 16 are OPUx overhead bytes; the rate of the OPUx is 4 976 640 kbit/s±20 ppm, the rate of the ODUx is 4 997 550 kbit/s±20 ppm, and the rate of the OTUx is 5 332 114 kbit/s±20 ppm.

14. The signal transport device according to claim 11, comprising the optical data tributary unit ODTUx2;

wherein the control unit comprises:

a mapping processing unit of an optical channel payload unit OPUx, adapted to map the constant-bit-rate CBR5G rate-level signals to the optical channel payload unit OPUx;

a mapping processing unit of an optical channel data unit ODUx, adapted to map the optical channel payload unit OPUx to the optical channel data unit ODUx;

a mapping processing unit of an optical data tributary unit ODTUx2, adapted to map the optical channel data unit ODUx to the optical data tributary unit ODTUx2; and a multiplexing processing unit of an optical channel data tributary unit group ODTUG2, adapted to multiplex the optical data tributary unit ODTUx2 to a corresponding timeslot of an optical channel data tributary unit group ODTUG2, for transport through the optical transport network.

15. The signal transport device according to claim 14, wherein the multiplexing processing unit of an optical channel data tributary unit group ODTUG2 comprises:

a mapping processing unit of an optical channel payload unit OPU2, adapted to map the optical channel data tributary unit group ODTUG2 to the optical channel payload unit OPU2;

a mapping processing unit of an optical channel data unit ODU2, adapted to map the optical channel payload unit OPU2 to the optical channel data unit ODU2; and a mapping processing unit of an optical channel transport unit OTU2, adapted to map the optical channel data unit ODU2 to the optical channel transport unit OTU2 for transport through the optical transport network.

16. The signal transport device according to claim 14, wherein the multiplexing processing unit of an optical channel data tributary unit group ODTUG2 comprises:

a mapping processing unit of an optical channel payload unit OPU2, adapted to map the optical channel data tributary unit group ODTUG2 to the optical channel payload unit OPU2;

a mapping processing unit of an optical channel data unit ODU2, adapted to map the optical channel payload unit OPU2 to the optical channel data unit ODU2;

a multiplexing processing unit of an optical channel data tributary unit group ODTUG3, adapted to map the optical channel data unit ODU2 to the optical channel data tributary unit group ODTUG3;

a mapping processing unit of an optical channel payload unit OPU3, adapted to map and multiplex the optical channel data tributary unit group ODTUG3 to the optical channel payload unit OPU3;

a mapping processing unit of an optical channel data unit ODU3, adapted to map the optical channel payload unit OPU3 to the optical channel data unit ODU3; and a mapping processing unit of an optical channel transport unit OTU3, adapted to map the optical channel data unit ODU3 to the optical channel transport unit OTU3 for transport through the optical transport network.

17. The signal transport device according to claim 11, comprising the optical data tributary unit ODTUx3;

wherein the control unit comprises:

a mapping unit of an optical channel payload unit OPUx, adapted to map the constant-bit-rate CBR5G rate-level signals to the optical channel payload unit OPUx;

a mapping unit of an optical channel data unit ODUx, adapted to map the optical channel payload unit OPUx to the frame structure of the optical channel data unit ODUx; and a mapping processing unit of an optical data tributary unit ODTUx3, adapted to map the optical channel data unit ODUx to the optical data tributary unit ODTUx3; and a multiplexing processing unit of an optical channel data tributary unit group ODTUG3, adapted to map the optical data tributary unit ODTUx3 to a corresponding timeslot in the optical channel data tributary unit group ODTUG3 for transport through the optical transport network.

18. The signal transport device according to claim 17, wherein the multiplexing processing unit of an optical channel data tributary unit group ODTUG3 comprises:

a mapping processing unit of an optical channel payload unit OPU3, adapted to map the optical channel data tributary unit group ODTUG3 to the optical channel payload unit OPU3;

a mapping processing unit of an optical channel data unit ODU3, adapted to map the optical channel payload unit OPU3 to the optical channel data unit ODU3; and a mapping processing unit of an optical channel transport unit OTU3, adapted to map the optical channel data unit ODU3 to the optical channel transport unit OTU3 for transport through the optical transport network.

19. A signal transport method applied in an optical transport network, comprising:

presetting frame structures for an optical channel payload unit OPUx and an optical channel data unit ODUx of a 5G path transporting constant-bit-rate CBR5G rate-level signals in an optical channel layer; wherein the OPUx data structure includes OPUx overhead bits and a OPUx payload unit for transporting the CBR5G signal, the ODUx data structure includes ODUx overhead bits, OPUx overhead bits, and a OPUx payload unit for transporting the CBR5G signal; and according to the frame structures of the optical channel payload unit OPUx and the optical channel data unit ODUx, mapping and multiplexing the constant-bit-rate CBR5G rate-level signals to the optical channel layer of the optical transport network for transport through the optical transport network, wherein the step of presetting further comprises:

presetting an optical channel transport unit OTUx of the 5G path transporting the constant-bit-rate CBR5G rate-level signals in the optical channel layer; and wherein the step of mapping and multiplexing comprises:

mapping the constant-bit-rate CBR5G rate-level signals to the optical channel payload unit OPUx;

mapping the optical channel payload unit OPUx to the optical channel data unit ODUx; and mapping the optical channel data unit ODUx to the optical channel transport unit OTUx for transport through the optical transport network.

20. The signal transport method according to claim 19, wherein the step of presetting further comprises:

presetting an optical data tributary unit ODTUx3 to map and multiplex the constant-bit-rate CBR5G rate-level signals transported through the 5G path in the optical channel layer to a 40G path; and wherein the step of mapping and multiplexing comprises:

mapping the constant-bit-rate CBR5G rate-level signals to the optical channel payload unit OPUx;

mapping the optical channel payload unit OPUx to the optical channel data unit ODUx;

mapping the optical channel data unit ODUx to the optical data tributary unit ODTUx3; and mapping and multiplexing the optical data tributary unit ODTUx3 to a corresponding timeslot in an optical channel data tributary unit group ODTUG3 for transport through the optical transport network.

* * * * *